Figure 4:
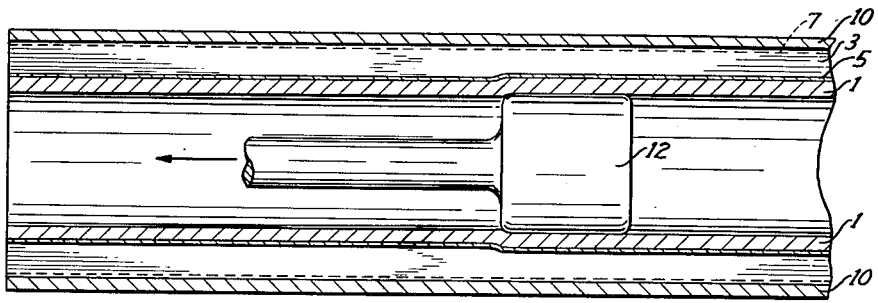

March 15, 1955   J. W. BROWN, JR   2,703,921
METHOD OF MAKING INTERNALLY FINNED TUBES
Filed April 14, 1949   4 Sheets-Sheet 1
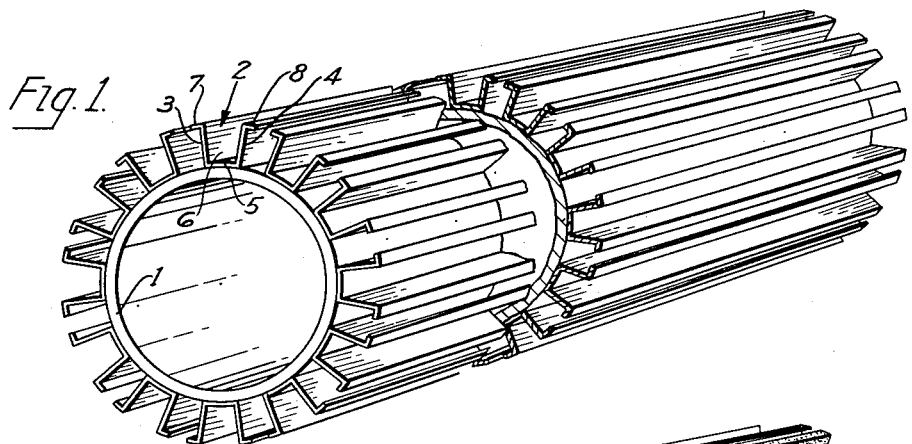
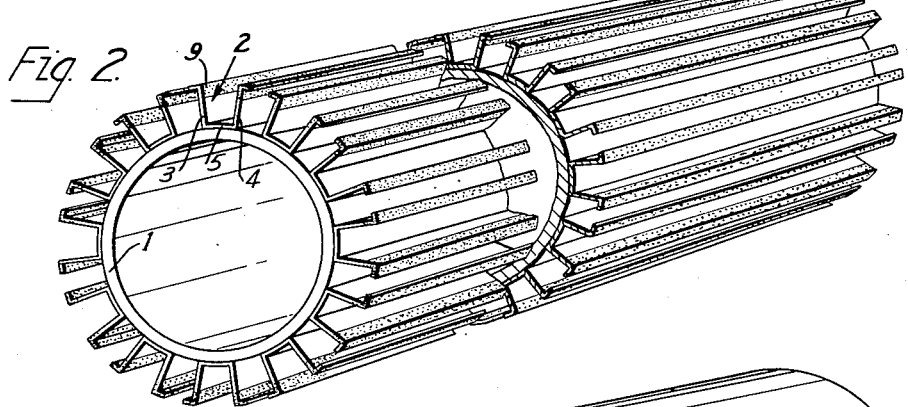
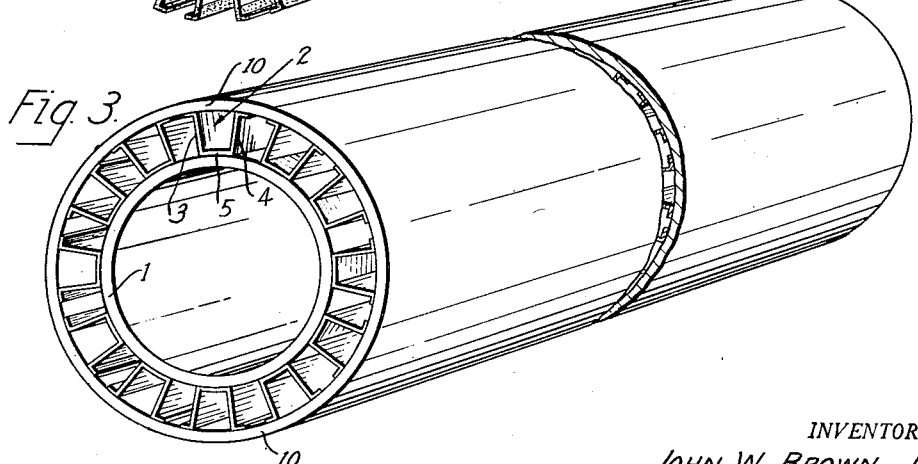
INVENTOR.
JOHN W. BROWN, JR.
BY
ATTORNEYS.

March 15, 1955  J. W. BROWN, JR  2,703,921
METHOD OF MAKING INTERNALLY FINNED TUBES
Filed April 14, 1949  4 Sheets-Sheet 2

REDUCING GAS

INVENTOR.
JOHN W. BROWN, JR.
BY Bosworth & Sessions
ATTORNEYS.

March 15, 1955  J. W. BROWN, JR  2,703,921
METHOD OF MAKING INTERNALLY FINNED TUBES
Filed April 14, 1949  4 Sheets-Sheet 4

INVENTOR.
JOHN W. BROWN, JR.
BY
Bosworth & Sessions
ATTORNEYS.

United States Patent Office 2,703,921
Patented Mar. 15, 1955

2,703,921

METHOD OF MAKING INTERNALLY FINNED TUBES

John W. Brown, Jr., Lakewood, Ohio, assignor to Brown Fintube Company, Elyria, Ohio, a corporation of Ohio Application April 14, 1949, Serial No. 87,466

6 Claims. (Cl. 29—157.3)

This invention relates to a process of making built-up tubes provided with internal fins and, if desired, with external fins as well. Such tubes, referred to herein as internally finned tubes, have widespread usefulness in many different arts, as, for example, in heat exchangers of various types, in the manufacture of chemicals, in the heating of water and other liquids, in refrigeration processes, etc. They are light and strong, and hence lend themselves also to structural uses. For the most part, they are fabricated of ferrous materials, although they may, if desired, be made instead of non-ferrous metals.

The manufacture of such internally finned tubes presents difficult problems, particularly if, as in the usual case, a firm bond characterized by extensive surface contact and a continuous metallic path between the fins and the tube is a desideratum. If, for example, the fins are set into recesses in the shell tube, they may become loose, thus detracting from their usefulness. If the fins are made and inserted individually, itself a costly and time-consuming operation, inaccuracies inadvertently introduced in the course of manufacture and assembly give rise to dimensional differences that may impair the value of the product for uses demanding a high degree of overall accuracy. The invention has for its principal objects to obviate these and other difficulties and provide internally finned tubes that in and of themselves constitute new and inherently better products.

For convenience, the invention will be described as it pertains to internally finned tubes of stainless steel having a chromium content of from 4 to 6 percent, although with few or no changes the same procedure may be used with other metals.

In the accompanying drawings, which show a variety of products and methods of making them, Figure 1 is a perspective of the first intermediate product obtained in the preferred method of practicing the invention, the same being continuous from end to end but shown as broken for convenience in illustration. Figure 2 is a similar perspective of a second intermediate product showing in somewhat exaggerated fashion a deposited coating of bonding material. Figure 3 is a similar perspective of a third intermediate product, which, following the performance of certain additional steps that do not change its external appearance, may be employed as such or used, if desired, for supporting a plurality of externally applied outer fins, a plurality of internally applied inner fins, or both.

Figure 5:
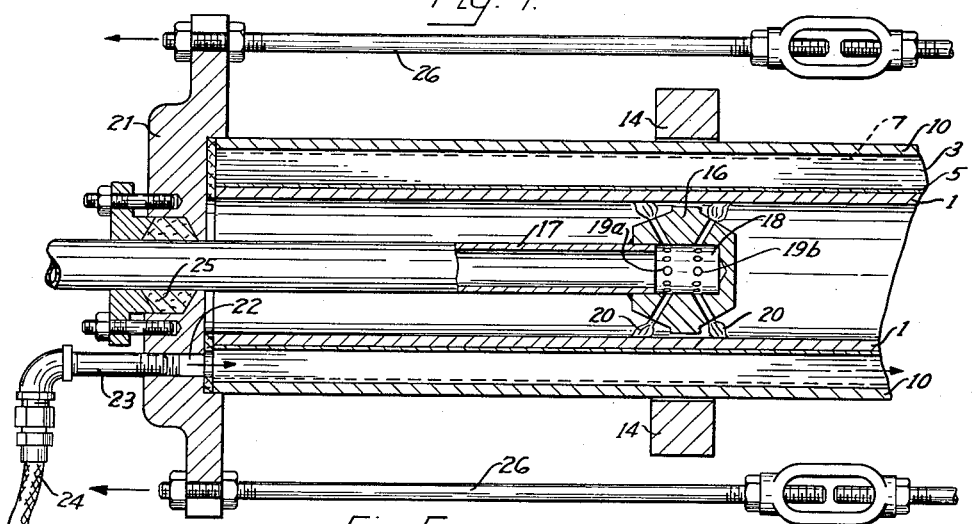

Figure 4 illustrates diagrammatically the step of mechanically expanding the inner structure to promote firm bonding of the fins to the other elements of the intermediate product shown in Figure 3; Figure 5, the step of thermally expanding the inner structure, at the same time bringing about fusion of the material or materials employed in effecting the bond between the fins and other elements.

Figure 6:
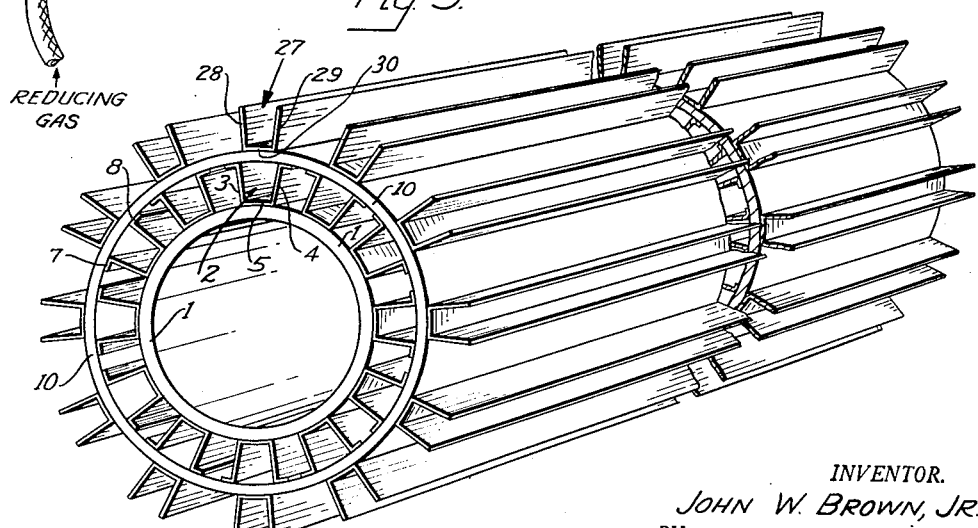
Figure 7:
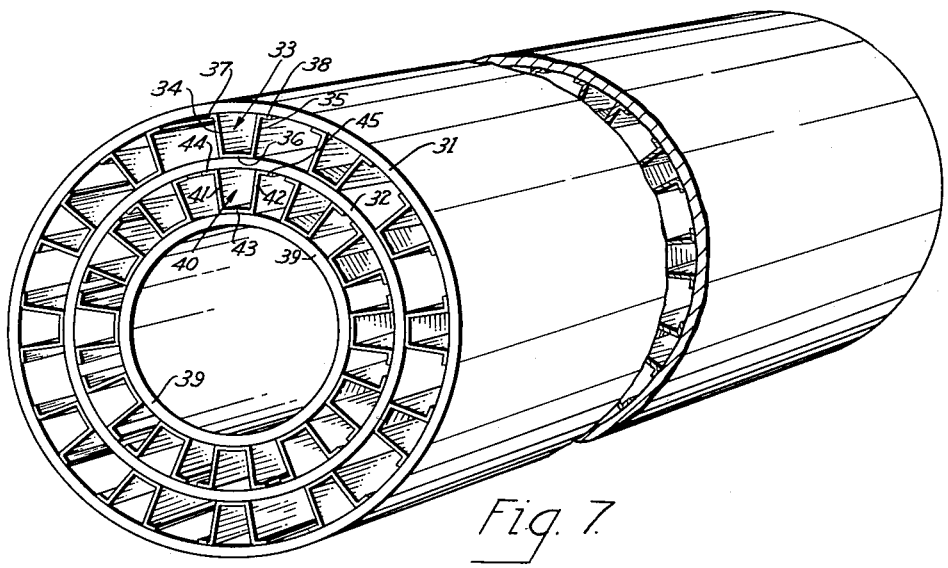
Figure 8:
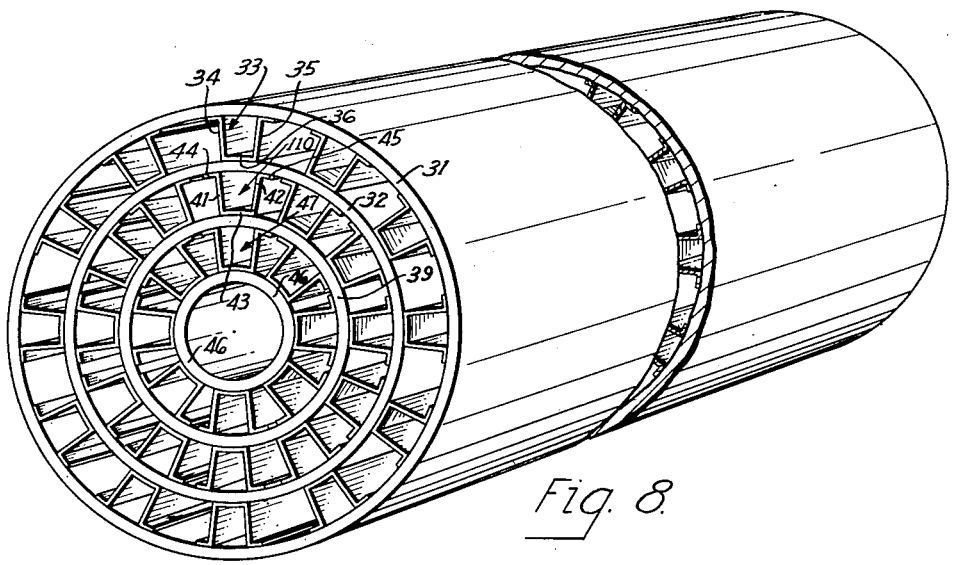
Figure 9:
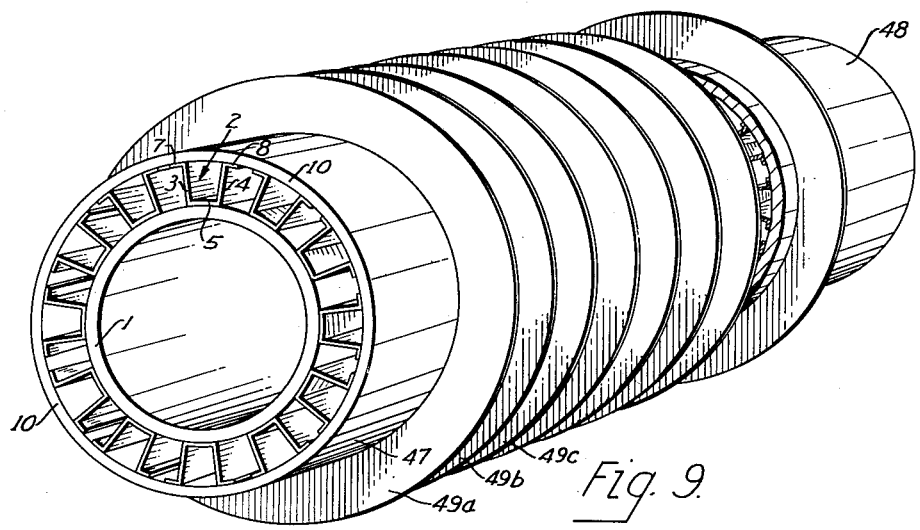
Figure 10:
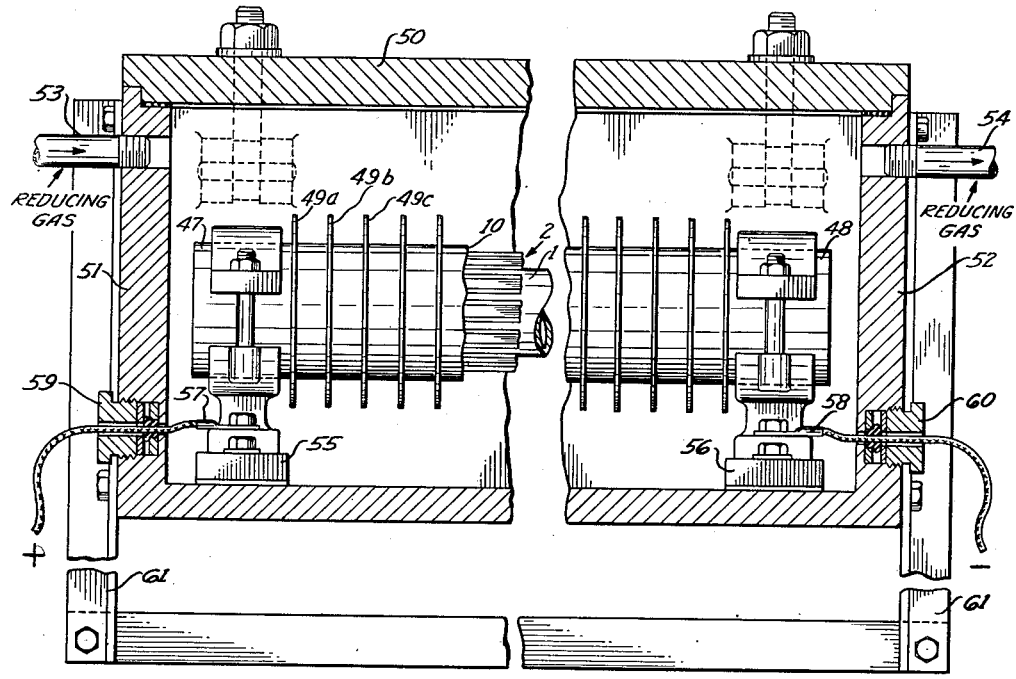

Figure 6 is a perspective of the product obtained by affixing longitudinally extending channel fins to the exterior surface of the product shown in Figure 3. Figures 7 and 8 are perspectives of products that may be made from, or by methods analogous to the method employed in making, the intermediate product shown in Figure 3; Figure 9 is a perspective of the product obtained by affixing transversely extending fins of annular configuration to the exterior surface of the product shown in Figure 3. Figure 10 illustrates an alternative heating step that may be used to advantage in the manufacture of the products shown in Figures 6 to 9.

As indicated in Figures 1 to 5, the manufacture of finned tubes of kinds to which the invention relates involves the performance of a series of steps and the production of a plurality of intermediate products. The finished product may be an internally finned tube having smooth exterior surface, corresponding in the latter respect to the intermediate product depicted in Figure 3 and the final products depicted in Figures 7 and 8, or it may be an internally finned tube similar, for example, to those illustrated in Figures 6 and 9, the exterior surfaces of which are provided with a plurality of outer fins. Where outer fins are employed, they may be applied either at an intermediate stage or as the final stage in the process of manufacture.

Referring to Figure 1, what is there shown is a tubular supporting element 1, which may be either solid or foraminous, to the exterior surface of which is firmly bonded a series of channel members 2. Each of the latter is made up of two longitudinally extending fins 3 and 4 joined at the base thereof by a connecting web or base 5 that may be and preferably is brought into conformity with the contour of the supporting element 1. Toward the outer portions of the various channel members 2 are laterally turned flanges 7 and 8, the same extending lengthwise of channel members from one end thereof to the other. If desired, flanges 7 and 8 may be given an arcuate cross section. They may, if desired, face toward each other, but preferably face in opposite directions away from each other as shown.

Flanged channel members are preferably employed although simple channel members with straight fins may be used if desired. The reason for employing flanged channel members is that in rolling the channel members from flat strip stock, flanges 7 and 8 may be formed in the same operation that forms the channel 6; consequently, the distance between base 5 and flanges 7 and 8 is determined by the contour of the rolls used in forming the channels and may be accurately controlled. It is important that this dimension be accurately maintained in order to secure proper fit when the supporting tube having the channel members secured thereto is inserted within the shell tube as described below. When unflanged channel members are used, the problem of controlling the depth of channel 6 from the base to the edges of the fin members is much more difficult inasmuch as this dimension is determined by the width of the strip; furthermore, in order to obtain the fins of precisely equal length the strip must be centered with great accuracy in the forming rolls. These difficulties are eliminated when the channel members are provided with flanges 7 and 8 as shown.

Channel members 2 are preferably welded to supporting element 1 by a method such as that described in Brown Patent No. 2,298,250, granted October 6, 1942, for Method of Making Finned Tubes.

The next step is to deposit on the outer portions of channel members 2 a coating 9 of bonding material. The deposited coating 9 is indicated diagrammatically in Figure 2 and for convenience in illustration is omitted in subsequent figures. This coating may be applied in any suitable manner; for example, by rolling the intermediate product in a shallow trough containing desired depth of bonding material. Where, as assumed for present purposes, the finned tube is made of elements of ferrous metal, coating 9 is preferably of metallic copper.

As is well known, a coating of metallic copper may be deposited on a ferrous surface by dipping the latter in an aqueous solution of copper sulfate, the copper being thereby precipitated from solution and deposited in the form of a thin film. This procedure is preferably employed in the practice of the invention where the tubes and fins are composed of ferrous materials; if desired, however, copper and coatings of substances other than copper may be applied in known ways, as, for example, by electroplating. Silver is an example of an electroplated coating. Solder, tin and other bonding metals such as alloys of copper may also be applied by various known methods.

A cupreous coating 9 having been applied as above described, the next step is to insert in shell tube 10 the finned inner structure so obtained; that is to say, the intermediate product illustrated in Figure 2. Preferably, the dimensions of shell tube 10 are such that the inner structure is co-extensive in length with and fits snugly within the interior surface of shell tube 10. If desired, the interior surface of the tube may be coated with bonding metal instead of coating the fins, or both tube and fins may be coated although this is not ordinarily necessary. In subsequent operations, the bonding metal is fused and alloys with the parent metal of both tube and fins, thus forming a continuous metallic path between tube and fins, giving ample mechanical strength and excellent heat transfer characteristics.

In cases in which the finned inner structure inserted in shell tube 10 has the conformation shown in Figure 2, the result of the fusing operation is to bond flanges 7 and 8 firmly to the interior surface of shell tube 10. In such case, the base of any given channel member 2 adjoins the exterior surface of tube 1; however, channel member 2 may, if desired, be so applied to supporting tube 1 that flanges 7 and 8 rest on or abut the exterior surface of supporting tube 1 and bases 5 abut the interior surface of shell tube 10. The step of fusing the bonding metal can then be effected as hereinafter described.

If desired, at this stage in the process, any outer fins that are to be applied may be mounted on the external surface of shell tube 10 to give the general appearance suggested by Figures 6 and 7. Assuming, however, that the external fins, if they are to be applied at all, are not to be applied until a later stage in the process, the next step is to expand the inner structure mechanically to enhance the degree of pressure contact between channel members 2 and interior surface of shell tube 10 and to insure the production of a strong, metallic bond when the bonding metal is fused by heat.

This expansion may be brought about in various ways but in Figure 4 is illustrated as being accomplished by drawing a mandrel 12, mounted on a mandrel rod, from right to left through the interior of supporting tube 1. Although some recovery, i. e., return to a smaller diameter, may be expected after the step of mechanically expanding the inner structure has been completed, enough permanent set can be introduced into the structure in this manner to bring and maintain the flanges 7 and 8 of channel members 2 in firm intimate contact with the inner surface of shell tube 10. The operation of expanding the inner tube after assembly is advantageous because it insures proper contact for the bonding operation, yet does not require an initially tight fit between the parts, thus making the assembly of the finned inner structure with the shell tube a comparatively easy matter even with tubes twenty or more feet in length.

The application of heat constitutes a further and in some cases final step in the process. Heat may be applied in any suitable way, for example, by placing the assembly in a furnace having the required temperature and atmosphere to complete the bonding operation. A preferred method is indicated in Figure 5. This figure illustrates an operation in which the finned tube assembly, capped at its ends, is drawn from right to left through circular high frequency induction block 14 which operates in known fashion to induce electrical currents and attendant localized heating effects in the outer portions of the assembly as it passes between the two blocks. Because the effect of heating the outer portions of the finned tube assembly is to expand shell tube 10, it is desirable, in order that the contact already achieved may not be lost, that the inner portions of the assembly be simultaneously heated from within.

To that end, a stationary torch 16 is located within supporting tube 1 in juxtaposition to induction block 14. Such torch is characterized, among other things, by a stationary feed pipe 17, an interior opening 18 into which feed pipe 17 discharges, and two series of peripheral ports 19a and 19b through which fuel gas is fed to the outside surfaces of torch 16. The flame emanating from ports 19a and 19b is designated 20 in Figure 5. Preferably torch 16 is of a diameter such as to enable it to fit fairly closely within supporting element 1. The purpose of interior heating step effected by means of torch 16 is to bring about expansion of supporting tube 1 corresponding roughly to the expansion introduced into shell tube 10 by the localized heating effected in the outer portions of the finned tube assembly by induction blocks 14.

In carrying out the bonding or brazing operation, it is preferable that a reducing atmosphere be provided in the region in which the bond is to be effected. To that end, a close-fitting cap 21 having an asbestos gasket therein is mounted on each end of shell tube 10, such caps being held together by a plurality of tie rods 26. Each cap is provided with a threaded opening 22 in which is mounted a threaded nipple 23 to which is coupled a flexible conduit 24. A reducing gas, e. g., hydrogen or partially burned natural gas, is admitted at one end of the finned tube assembly and withdrawn at the other by means of flexible conduits 24, passing in an axial direction through the annular space in which are located channel members 2. In each cap 21, in proximity to feed pipe 17, is a packing gland 25, the purpose of such glands being to permit caps 21 and the finned tube assembly on which they are mounted to slide over stationary feed pipe 17 while substantially preventing the escape of gas or products of combustion.

Upon completion of heating operations, the assembly is allowed to cool until bonding has taken place. Thereupon caps 21 are removed from the assembly and the latter is disengaged from torch 16 and induction block 14: this is accomplished by drawing the assembly in a direction opposite the original direction of travel; that is to say, from left to right as seen in Figure 5. Where copper is used as the bonding material, the above-described sequence of heating and cooling operations results in the flanges 7 and 8 being copper-brazed to the interior of the shell tube 10, the metallic bond so produced being mechanically strong and having excellent heat transmission characteristics.

If, as assumed, outer fins have not in the meanwhile been applied to the finned tube assembly, they may be applied at this stage. As indicated in Figure 6, such outer fins may be co-extensive with the assembly and may, if desired, consist of longitudinally extending exterior channel members 27 having fins 28 and 29. If so, they may be mounted on shell tube 10 as shown in Figure 6, with bases 30 in contact with the exterior surface of shell tube 10. Obviously, it is not necessary that channel members be employed, for individual fins may be bonded or otherwise affixed to the assembly in any suitable way; where, however, outwardly facing channel members are employed, the same may be applied to the exterior surface of shell tube 10 by the method described in Brown Patent No. 2,298,250.

If desired, the finned tube assembly of Figure 6 may be modified by providing the exterior channel members thereof with flange portions similar to flange portions 7 and 8 (Figures 1 to 3), inserting it in a surrounding tube and brazing together the component parts of the resulting structure. The product so obtained, represented in Figure 7, is characterized by three concentric tubes separated from each other by annular passages through which a fluid or fluids may be caused to flow. Each such annular passage has a series of channel members analogous to channel members 2 in the finned tube assembly shown in Figure 3. The outermost tube so added constitutes the shell tube, while the two tubes located interiorly thereof may be regarded as supporting tubes analogous to supporting tube 1 in the product illustrated in Figure 3.

However, the product shown in Figure 7 may be formed to better advantage by inserting in a shell tube 31 of relatively large diameter an inner structure consisting of a supporting tube 32 to the exterior surface of which have been welded channel members 33, the latter having longitudinally extending fins 34 and 35, connecting bases 36, and flanges 37 and 38. The flanges preferably are coated with copper or other suitable bonding metal as before. As a step preliminary to subsequent heating operations, supporting tube 32 may then be mechanically expanded as illustrated in Figure 4. A similar inner structure of smaller dimensions consisting of a supporting tube 39 and a series of channel members 40, each made up of longitudinally extending fins 41 and 42, a base 43, and flanges 44 and 45, may then be prepared as illustrated in Figure 2 by the application of metallic copper or other bonding metal to the outer surfaces thereof, inserted, and mechanically expanded in place against the interior surface of supporting tube 32. After mechanical expansion of supporting tube 39 as illustrated in Figure 4, the entire assembly may be subjected to a heating step of the kind illustrated in Figure 5.

The introduction of still another supporting tube 46 having on the exterior surface thereof a series of channel members 47 may be effected in similar manner, giving rise to a product of the kind shown in Figure 8.

An internally finned tube analogous to that of Figure 6 but of somewhat different configuration is illustrated in Figure 9. Although the internally finned tube therein shown is characterized by the presence of a series of external fins, the latter do not take the form of longitudinally extending fins nor do they cover shell tube 10 from end to end, no external fins being applied to the shell tube at the end portions 47 and 48 thereof in the form of the invention shown in the drawing. The external fins applied to the portion of shell tube 10 between end portions 47 and 48, respectively designated 49a, 49b, 49c, etc., are annular and extend radially outward. They may be mounted singly or in groups, as may be desired, and may be bonded in any suitable way to the shell tube. As will appear, the bonding of inner and outer fins, respectively, to the interior and exterior surfaces of shell tube 10 may conveniently be accomplished simultaneously.

Preferably, the outer annular fins are applied before the supporting tube is expanded; the expansion of the supporting tube in the manner previously described then also results in expansion of the shell tube 10 into firmer engagement with annular fins 49a, 49b, 49c, etc.

If, as preferred, cupreous bonds are to be formed, the outer portions of channel members 2 and the inner portions of external fins 49a, 49b. 49c, etc., are prepared for bonding by depositing thereon at appropriate stages in the process suitable coatings of metallic copper. In such case, simultaneous bonding may be effected by fusing the deposited coating materials. To this end, a heating operation is employed which replaces, but which may, if desired, supplement, the heating operation described in connection with Figure 5.

Assuming that a metallic coating has been applied to the outer portions of channel members 2, that the inner structure has been inserted and mechanically expanded in place in shell tube 10, and that the desired bonding material, such as a coating of metallic copper, have been applied to the inner portions of fins 49a, 49b. 49c, etc., the whole may then be placed in a furnace of the kind shown in Figure 10 characterized, among other things, by a pivotally clamped cover 50, by end walls 51 and 52, and by nipples 53 and 54 through which a reducing gas such as partially burned natural gas or hydrogen is supplied and withdrawn in order that a reducing atmosphere may be maintained within the furnace.

Supporting yokes 55 and 56 are provided, the same being equipped with clamping means as shown in Figure 10. Yokes 55 and 56 have leads 57 and 58 attached thereto by means of which an electrical current may be passed through the yokes and thus through the finned tube assembly mounted thereon. Leads 57 and 58 are passed through suitable fittings of the nature of insulators designated 59 and 60 and located respectively in end walls 51 and 52 of the furnace. The furnace itself is supported upon standards 61.

With cover 50 clamped in place to prevent escape of reducing gas into the room, electric current of the characteristics required to heat the finned tube assembly is then supplied, the heat being developed in the assembly itself by reason of the resistance of the assembly to the flow of current, thus bringing about the fusion of the several cupreous coatings inside and outside shell tube 10 and the bonding of the parts by strong, heat-conducting alloy bonds.

From what has already been said, it is apparent that many changes may be made in the practice of the invention, including the use of fins of other types than those described. While it is preferable for certain purposes that longitudinally extending fins such as those indicated in Figures 1 to 3 and 6 to 8 should be co-extensive with the interior or exterior surface of the shell tube, as the case may be, it is not necessary that this be the case; as a matter of fact, the fins may be staggered or interrupted to provide spaced groups of fins. Similarly, it is not necessary that the annular fins 49a, 49b, 49c, etc., illustrated in Figure 9 take the form of separate fins having a generally circular periphery; they may, for example, have a periphery that is pentagonal, hexagonal, octagonal, etc., and, where desired, may be paired together with an outside connecting web between adjacent fins so that each pair in effect forms a torus surrounding the shell tube.

While the preferred materials set forth herein are tubes and fins of steel or other ferrous material bonded by bonds composed of copper alloyed with the underlying ferrous material, it will be evident that other bonding materials and other materials for tubes and fins may be employed; for example, copper tubes and fins may be bonded by ordinary solder or silver solder, aluminum tubes and fins bonded by the "alclad" process, in which the members are composed of aluminum alloy coated with thin layers of very pure aluminum having a lower melting point than the alloy, the pure aluminum being fused to bond the parts, may be employed. Numerous other changes may be effected if desired.

It is intended that the patent shall cover, by suitable expression in the appended claims, whatever features of patentable novelty reside in the invention.

I claim:

1. A process of making internally finned tubes comprising the steps of rolling a plurality of separately formed longitudinally extending metal open channel members, each channel member having two fins extending from the base thereof, said fins terminating in substantially flat longitudinally extending laterally turned flanges, bonding the base portions of said channel members to the exterior of a tubular supporting member, inserting said tubular supporting member with said channel members secured thereto into a metal shell tube, disposing bonding metal adjacent the contiguous surfaces of the shell tube and said flanges, thereafter expanding the tubular supporting member and thereby forcing said flanges of the channel members into intimate contact with the inner surface of the shell tube, and heating the entire assembly to a temperature sufficient to cause fusing of the bonding metal and consequent bonding of said flanges to the shell tube.

2. A process according to claim 1 wherein the channel members are bonded to the exterior of the supporting member by welding.

3. A process as in claim 1 in which an electric current is passed directly through the assembly in the performance of the heating step.

4. A process as in claim 1 in which electric induction heating is employed in the performance of the heating step.

5. A process as in claim 1 in which an internal torch is employed in the performance of the heating step.

6. A process of making heat exchangers comprising the steps of rolling a plurality of separately formed longitudinally extending metal open channel members, each channel having two fins extending from the base thereof, said fins terminating in substantially flat longitudinally extending laterally turned flanges, bonding the base portions of said channel members to the exterior of a tubular supporting member, inserting said tubular supporting member with said channel members secured thereto into a metal shell tube, disposing bonding metal adjacent the contiguous surfaces of the shell tube and said flanges, thereafter expanding the tubular supporting member and thereby forcing said flanges of the channel members into intimate contact with the inner surface of the shell tube, thereafter inserting into the supporting member a second tubular supporting member having on its periphery a plurality of separately formed longitudinally extending metal channel members and having bonding metal disposed adjacent the contiguous surfaces of the first supporting member and the channel members on the second supporting member, expanding the second supporting member and thereby forcing the outer-most portions of the channel members carried thereby into intimate contact with the inner surface of the first supporting member, and heating the entire assembly to a temperature sufficient to cause fusing of the bonding metal and consequent bonding of the flanges of the channel members on the first supporting member to the shell tube and the channel members on the second supporting member to the first supporting member.

References Cited in the file of this patent

UNITED STATES PATENTS

| 1,970,481 | Young | Aug. 14, 1934 |
| 2,059,992 | Gould | Nov. 3, 1936 |
| 2,067,678 | Nesselmann | Jan. 12, 1937 |

(Other references on following page)

UNITED STATES PATENTS

| | | |
|---|---|---|
| 2,316,273 | Meyer | Apr. 13, 1943 |
| 2,362,985 | Brown | Nov. 21, 1944 |
| 2,373,116 | Hobrock | Apr. 10, 1945 |
| 2,378,646 | Manning | June 19, 1945 |
| 2,401,032 | Williams | May 28, 1946 |
| 2,431,157 | Zelinka | Nov. 18, 1947 |
| 2,487,257 | Morgan | Nov. 8, 1949 |
| 2,521,369 | Holm et al. | Sept. 5, 1950 |
| 2,611,585 | Bolling | Sept. 23, 1952 |

FOREIGN PATENTS

| | | |
|---|---|---|
| 437,812 | Germany | Nov. 26, 1926 |